United States Patent [19]

Muir

[11] Patent Number: 4,607,353

[45] Date of Patent: * Aug. 19, 1986

[54] SEISMIC EXPLORATION USING NON-IMPULSIVE VIBRATORY SOURCES ACTIVATED BY STATIONARY, GAUSSIAN CODES TO SIMULATE AN IMPULSIVE, CAUSAL GENERATING, RECORDING AND PRE-PROCESSING SYSTEM AND PROCESSING THE RESULTS INTO DISTORTION-FREE FINAL RECORDS

[75] Inventor: Francis Muir, Laguna Niguel, Calif.

[73] Assignee: Chevron Research Company, San Francisco, Calif.

[*] Notice: The portion of the term of this patent subsequent to Aug. 24, 1999 has been disclaimed.

[21] Appl. No.: 525,761

[22] Filed: Aug. 23, 1983

[51] Int. Cl.$^4$ .............................. G01V 1/00; G01S 9/68
[52] U.S. Cl. ...................................... 367/39; 367/100; 364/421
[58] Field of Search ........................ 367/39, 41, 55, 60, 367/100, 905; 364/421, 717, 728

[56] References Cited

U.S. PATENT DOCUMENTS

| | | | |
|---|---|---|---|
| 2,688,124 | 8/1954 | Doty et al. | 367/41 |
| 3,264,606 | 8/1966 | Crook et al. | 367/39 |
| 3,697,938 | 10/1972 | Taner | 367/39 |
| 3,863,058 | 1/1975 | Savit | 367/41 |
| 4,023,026 | 5/1977 | O'Farrell | 364/717 |
| 4,044,356 | 8/1977 | Fournier | 367/39 |
| 4,049,077 | 9/1977 | Mifsud | 367/39 |
| 4,054,862 | 10/1977 | Bachman | 367/100 |
| 4,064,481 | 12/1977 | Silverman | 367/40 |
| 4,086,560 | 4/1978 | Johnston et al. | 367/100 |
| 4,156,876 | 5/1979 | Debuisser | 364/728 |
| 4,168,485 | 9/1979 | Payton et al. | 367/41 |
| 4,189,704 | 2/1980 | Martin et al. | 367/60 |
| 4,234,053 | 11/1980 | Erich | 367/55 |
| 4,346,461 | 8/1982 | Muir | 367/39 |
| 4,486,866 | 12/1984 | Muir | 367/39 |

FOREIGN PATENT DOCUMENTS 720392  3/1980  U.S.S.R. ................. 367/39

OTHER PUBLICATIONS

Bernhardt et al., "Encoding Techniques for the Vibrsels System", 3/78, Geophy. Prosp., vol. 26, #1.
Barbier, "Sosia, A New Seismic Method", 11/12/70, pp. 1–23, Meeting of Society of Explor. Geophys.
Bacher et al., "Linear Modelling . . . Input Signals", 1968, pp. 393–416, Automatica, vol. 4.
Achroyd et al., "Optimum Mismatched . . . Suppression", 3/73, IEEE Trans. on Aerospace & Elect. Syst., vol. 9, #2, pp. 214–218.
Horton, "Noise–Modulated . . . Systems", pp. 821–828 Proc. of IRR, vol. 47, 5/59.
Evisar, "The Pulsed Vibrator as a Seismic Source", 6/57, pp. 383–391, 12th Mtg. of Europ. Assoc. of Expl. Geophys.
Cunningham, Geophysics, Dec. 1979, vol. 44, No. 12, pp. 1901 et seq., "Some Alternate Vibrator Signals".

*Primary Examiner*—Charles T. Jordan
*Assistant Examiner*—Brian S. Steinberger
*Attorney, Agent, or Firm*—H. D. Messner; Edward J. Keeling

[57] ABSTRACT

The disclosed invention is a method of seismic exploration using non-impulsive vibratory sources activated by filtered stationary, Gaussian codes. The method adds a distortion-free quality to the full-waveform seismic records.

8 Claims, 2 Drawing Figures

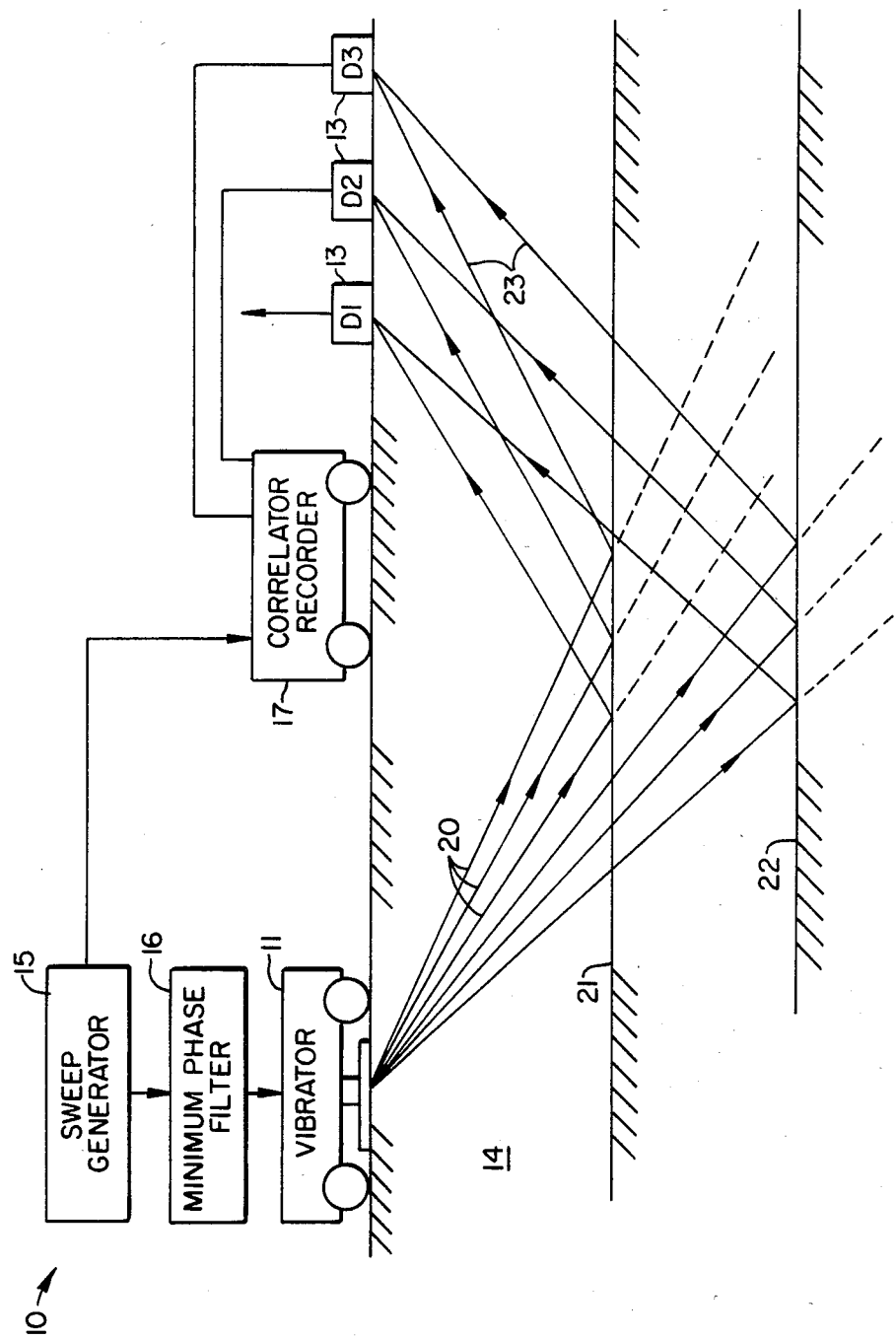
FIG._1.

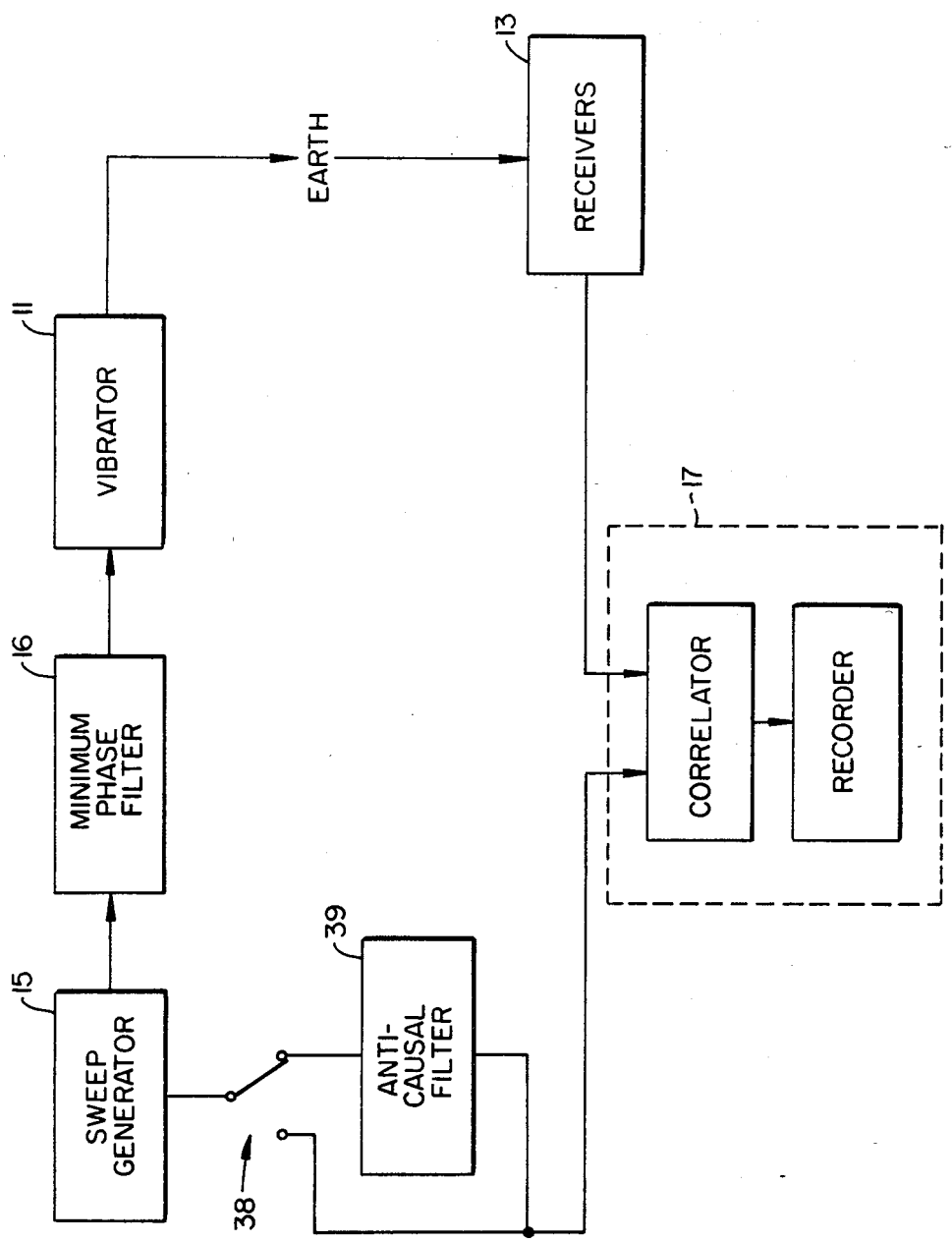
FIG._2.

SEISMIC EXPLORATION USING NON-IMPULSIVE VIBRATORY SOURCES ACTIVATED BY STATIONARY, GAUSSIAN CODES TO SIMULATE AN IMPULSIVE, CAUSAL GENERATING, RECORDING AND PRE-PROCESSING SYSTEM AND PROCESSING THE RESULTS INTO DISTORTION-FREE FINAL RECORDS

CROSS-REFERENCE TO RELATED APPLICATION

This application relates to U.S. Ser. No. 316,006, filed Oct. 28, 1981, for "Seismic Exploration Using Non-Impulsive Vibratory Sources Activated By Stationary Sign-Bit Recording Gaussian Codes and Processing That Results in Distortion-Free Final Records Particularly Useful in Stratigraphic Trap Determination", assigned to the assignee of the present application now U.S. Pat. No. 4,486,866; and also relates to the following U.S. applications filed simultaneously herewith, viz., Ser. No. 525,587 for "Seismic Exploration using Non-impulsive Vibratory Sources Activated by Stationary, Gaussian Codes, Detecting Vibrations via Receivers Within a Wellbore and Processing the Results Into Distortion-free Final Records", and Ser. No. 525,760 for "Seismic Exploration Using Nonimpulsive Vibratory Sources Activated by Stationary, Gaussian Codes, and Processing the Results In Distortion-free Final Records Particularly Useful in Urban Areas".

FIELD OF THE INVENTION

This invention relates to seismic exploration in which seismic vibrations, generated by one or more non-impulsive vibratory sources, are injected into the earth, and subsequent vibrations are recorded by one or more detectors positioned within a wellbore displaced from the source. More particularly, the invention relates to the enhanced recovery of desired seismic wave form information even though representations of the vibratory waves injected into the earth would normally be subject to non-linear distortion. In a further aspect, the present invention has the surprising capability of generating vibrations into the earth which simulate an input of a conventional impulsive, causal system such as dynamite. The resulting records, after correlation, are single-sided with time, always beginning at a time zero equal to the initiation of the non-impulsive vibratory source.

BACKGROUND OF THE INVENTION

The term "to simulate an impulsive causal system" refers to the fact that in generating, collecting and processing seismic information using an impulsive system associated with an earth formation, such systems are based upon the assumption that the responses of the associated elements in the chain are always causal and often precisely or substantially minimum phase. The accuracy of the assumption can be attested to by the fact that processing techniques such as deconvolution yield such accurate results. But in non-impulsive generation of input vibratory waves followed by collection and processing of the received data that include steps related to the cross-correlation of the input and received signals, the elements in the aforementioned chain are not minimum phase. Such realization is seen in the fact that conventional cross-correlated records, the correlation functions are double sided in time; on one side the correlation pulses go forward in time; on the mirror image, the correlation pulses go backward as defined by a series of negative time values. In this regard, see "Reflection Seismology", Kenneth H. Waters, John Wiley & Sons, 1st Ed. at page 80 where a series of typical autocorrelation functions are described.

Likewise, the term "single-sided, with time" refers to the fact that in the non-impulsive system of the present invention, the cross-correlated final records define correlation pulses that begin at time zero exactly coinciding with the time of activation of the non-vibratory source, that is to say, without a mirror image of the correlation pulses being generated about time zero, as heretofore practiced.

The term "distortion-free, after processing" to describe the final records relates to the fact that there should be no undesired or unknown, linear or non-linear change in the waveforms either of the recorded field signals or of the final data after processing has been completed.

Prior to my invention, such distortion could be brought about (i) by the use of generating/recording techniques in the field wherein harmonics of the fundamental dissipate its energy, or (ii) accidentally, where the vibrator pad and the earth do not linearly interface.

Doty et al., U.S. Pat. No. 2,688,124, issued Aug. 31, 1954, for "Method and Apparatus for Determining Travel Time of Signals" describes the well-known VIBROSEIS ® system of Continental Oil Company. In such a system, seismic waves are generated by mechanical vibrators on the earth's surface. Each of the vibrators is firmly anchored to the earth by the combined weight of the source. Peak forces in the neighborhood of 10 to 20 tons (and up to 36 tons) can be developed by the rapid, non-explosive interaction of the base-plate and piston system of each vibrator. Consequently, the weight of each vibrator is proportionally large to maintain the desired, continuous vibrator-earth contact during operations. The waves sent into the earth consist of long, sinusoidal wave trains of predetermined frequency and time duration characteristics rather than the much sharper wave impulses sent into the earth by the explosive sources used prior to the VIBROSEIS ® system, or by "weight drop" methods including those provided by various impulse-coded systems, e.g., the so-called "pulse-coded" techniques.

There may be some confusion as to the differences of the signals produced by the VIBROSEIS ® system and those produced by impulsive sources such as provided by exploding dynamite, exploding mixtures of propane and air, or by "weight drop" methods, including pulse-coded techniques.

It is well known that the capacity of any signal (including seismic signals) to carry information can be measured in a manner analogous to determining the volume of a container. Since volume is the product of height times width times length; similarly, information capacity of a signal is related to a product of amplitude, frequency bandwidth and the length of the signal.

Dynamite as a seismic energy source produces an input signal having considerable amplitude (height) and bandwidth, but has very short length. On the other hand, "non-impulsive" vibrations generated in the manner of a VIBROSEIS ® system have limited amplitude, but such is compensated for by the long length of the input signal and a faithful, continuous reproduction of the control signal over the frequency spectrum of interest. That is to say, in the VIBROSEIS ® system, the amplitude and phase spectra are carefully and continuously controlled so that the resulting energy spectra changes smoothly as a function of time. Thus, a smoothly varying output of desired frequency and duration characteristics is provided in contradistinction to the binary-coded (ON-OFF) square wave output generated by pulse-coded methods in which the energy-per-blow is substantially constant and cannot be so controlled.

A further essential part of the VIBROSEIS ® system lies in the processing of the received data to produce records that tend to show short pulses representing reflections from subsurface interfaces. Such responses are provided by cross-correlating the recorded representation of the vibratory waves sent into the ground with the recorded representation of the waves received subsequently.

There is a further difference between impulsive systems wherein the injected waves are created by explosive sources, and non-impulsive systems. These differences have to do with causation. In the former, the explosion of the source establishes time zero for system operations; in the latter, the vibrations are injected into the earth over a longer time period and then facsimiles of the source output reflected at every interface in the reflection path are identified by cross-correlation. While such process can be regarded as a mechanism for seeking out and marking the individual facsimiles of the input vibrations (signals) in the received signal, the fact that a mirror image in the correlation function often results was heretofore not taken as demonstrating any deleterious effects. This was caused in part by the fact that the correlation process was known to be a convolution, with the signal turned around in time.

The use of cross-correlations, as taught by Doty et al. and many others since, has now become so well known in vibratory seismology that it will be presumed to be well known in the following parts of the present specification; and the description will concern itself only with differences from the prior art.

Erich, U.S. Pat. No. 4,234,053, for "Seismic Exploration Method Using a Rotating Eccentric Weight Seismic Source", describes an exploration method in which a rotating eccentric weight source is used (as a power impactor) to transmit a coded, non-Gaussian impulse input signal into the earth on a substantially constant energy-per-blow basis. An improved representation of the pulsed input signal is correlated with the raw seismic data to provide the field record of interest. But since the impulsive source is also only discontinuously coupled to the earth (i) the interaction of the mass of the eccentric weight source with the spring constant of the earth produces an output dominated by low frequency components and (ii) the pulse shape of the output can vary non-linearly with time. Hence, such a system is limited to those uses where a conventional VIBROSEIS ® system cannot be employed.

Multi-array use of such sources is likewise limited.

Another relevant patent is that of Crook et al., U.S. Pat. No. 3,264,606, issued Aug. 2, 1966, for "Method and Apparatus for Continuous Wave Seismic Prospecting", which teaches driving of vibratory sources (in conjunction with conventional full-wave recording equipment) with pseudo-random codes which, although differing in detail from the preferred codes prescribed here, does share the desirable generic property of "a code sequence which may be represented as a reference time series having a unique auto-correlation function comprising a single major lobe having no side lobes of greater amplitude than the side lobes of the auto-correlation function of statistically unrelated noise components of the composite signal detected at said detecting location" (column 13, lines 32–44).

In my U.S. Pat. No. 4,346,461 for "Seismic Exploration Using Vibratory Sources, Sign-Bit Recording, and Processing That Maximizes the Obtained Subsurface Information", issued Aug. 24, 1982 and assigned to the assignee of the present application, I describe a non-impulsive vibratory system that uses a class of vibrator signals best characterized as Gaussian, zero-mean, and stationary, in conjunction with sign recording of both the injected and received vibrations at the sources and receivers. The stated advantages relate to the channel-capacity economy of sign-bit recording (at both the sources and receivers), and to the distortion-free quality of the final processed records.

I have now discovered that use of the above class of vibrator signals not only does not sacrifice information in the final processed records even though the data is collected by sign-bit recording methods, but such type of vibrator signals also favorably impacts seismic recording and processing operations where vibrator system distortion is present and when full-wave recording is contemplated.

Aside from the above, a paper of A. B. Cunningham, *Geophysics*, December 1979, Vol. 44, No. 12, pages 1901 et seq., for "Some Alternate Vibrator Signals", works out in mathematical detail expected types of cross-correlation functions from various types of vibrator sweeps, including certain types of pseudo-random sweeps, but not in the context used herein.

SUMMARY OF THE INVENTION

The present invention uses a class of non-impulsive vibrator signals best characterized by the combination of a precursor vibratory drive code of Gaussian, zero-mean, and stationary characteristics, in conjunction with conventional full-wave recording.

Prior to actually driving the vibrator, the Gaussian, zero-mean, stationary precusor code of the present invention is passed through a minimum phase filter and thence to the vibrator itself. In subsequent cross-correlation processing, the aforementioned precusor drive code (not the drive code itself) is used. Result: the final cross-correlation functions as depicted on the final records surprisingly simulate operations of an impulsive causal system wherein the correlation functions begin at time zero equal to initiation of the vibrator.

Since the final records are surprisingly distortion-free, they have a superior capability of, say, indicating oil and gas accumulations associated with the surveyed earth formation adjacent the wellbore.

These and other features and advantages of the present invention will become evident to exploration seismologists in light of the following specification, including the appended drawings briefly described here.

BRIEF DESCRIPTION OF THE DRAWINGS

FIG. 1 is a side elevation of an earth formation penetrated by a wellbore and shows major pieces of apparatus used in a survey system for carrying out the present invention, the survey system including a vibratory source adapted to be driven by a Gaussian, zero-mean, stationary code, a series of receivers located in the wellbore to receive the propagated portions of the injected vibrations, and processing and recording means for the generated and recorded signals.

FIG. 2 is a schematic diagram in block form of the system of FIG. 1 showing paths along which signal information flows, in accordance with the present invention.

DETAILED DESCRIPTION OF THE INVENTION

Refer now to FIG. 1, 10 illustrates the survey system of the present invention. System 10 includes vibratory source 11 positioned at a location distant from a series of detectors 13. In operation, vibratory source 11 injects seismic vibrations in a continuous and non-impulsive manner into the earth formation 14. Amplitude-versus-time characteristics of the vibrations of the source 11 vary over a predetermined time duration and frequency spectrum, under control of a drive code generated by sweep generator 15 and passing through minimum phase filter 16. The sweep control signal fed to vibratory source 11 (before filtering) is also passed through a separate information channel to correlating and recording unit 17.

In FIG. 1 the vibratory waves going into earth formation 14 are represented by ray paths 20, the waves traveling obliquely downward toward a pair of stratal interfaces 21, 22 where they undergo partial reflection and travel back upwards along paths 23, again obliquely, toward the detector 13. In addition to the detecting waves traveling upwardly from interfaces 21, 22 where they undergo partial reflection and travel back upwards along paths 23, again obliquely, toward the series of detectors 13 at earth's surface 12. While only three symbolic detectors are shown in FIG. 1, in actual current field practice, several detectors may be employed. From detector 13, the final operations represented in FIG. 1 are transmissions of full-waveform data to the processing and recording unit 17. In the unit 17, cross-correlations are made of the full-wave received data and the unfiltered injected vibratory sweeps.

When waveforms are cross-correlated and stacked with a high multiplicity, the stacked cross-correlations associated with the injected vibrations are superior to those of recordings associated with chirp signals. But the mere appearance of superiority would not convince seismologists in general that the desirable information is due to the above-mentioned type of vibratory input.

Moreover, in the present invention it is possible to state that for currently practiced seismic exploration if those specified types of driving functions and filtering techniques are used, the resulting seismic information will be surprisingly distortion-free.

The physical steps of the present invention, when properly combined, make possible the utilization of the theoretically provable, maximum amount of information that can be recovered from the correlated waveforms.

That it should be possible to better recover distortion-free information from correlations of a stationary, zero-mean, Gaussian function was obliquely implied in theoretical results obtained by Bussgang. These results are concerned with noise for the purpose of data communication and, to my knowledge, have remained relatively unknown among exploration geophysicists. Their geophysical implications require an unobvious twist of thought in that it is necessary to think of Bussgang's "noise" as a possible seismic "signal", just the opposite from what would then be called the "noise" in the seismic context. [Chapters 5 and 6, e.g., of *An Introduction to Statistical Communication Theory*, J. B. Thomas, John Wiley & Sons (1969), are seen to express "noise" and "signal" in such conventional terms.]

The results of Bussgang that bear upon the present invention are equations given here in notation different from that originally used notation, but more like that used in current theoretical seismology.

Bussgang's result can be stated as follows:

Let
W, Y be stationary, jointly Gaussian, zero-mean, random processes (continuous in nature or sampled representations of such continuous processes);
X(.,.) be the cross-correlation operator; and
k(.) be a characteristic of any non-linear function (i.e., k is a fixed mapping function or table that converts input values to output values but not necessarily one-to-one).

Then $$X(W,Y)=a;\ X[W,k(Y)]=b;\ X[k(W), Y] \quad (2)$$

where a and b are constants depending only on k and the sequence affected by k.

In words, equation (2) states that given two input signals (W and Y) with certain properties, their cross-correlation $X(W,Y)$ is unaffected, except to a scale factor, by any distorting mechanics that either one might suffer.

In such case, $X(W,Y)$ represents the correlated output of a true amplitude recording system (i.e., without non-linear distortion); a $X[W,k(Y)]$ represents the correlated output of a system in which the data undergoes non-linear distortion as it comes through the geophone, and then is correlated with the sweep signal; and b $X[k(W,Y]$ represents the correlated output of a system in which the sweep undergoes non-linear distortion, and then is correlated with the unclipped output of the geophone.

Interpreted in this fashion, we can distinguish the two cases where:

(i) Y, the recorded signal, is subjected to the non-linearity, k, before correlation; and (ii) W, the source signal, is subjected to k before correlation.

These results apply directly to seismic prospecting where W is the motion of a vibratory source and Y is the consequent motion of the earth picked up by a geophone of a series of geophones.

In this case it is well known that W and Y are related through the usual convolutional equation:

$$Y = E^* W + N \quad (3)$$

where E is the impulse response of the earth and N represents any uncorrelated noise present at the geophone.

Interpreted in this fashion, the extension of Bussgang's result to seismic prospecting implies that if the sweep and recorded data have the right properties, non-linear operations produce no distortion; but in case (i) above there is a loss of absolute trace amplitude information. Absolute amplitude data is lost because Bussgang's extension applies to normalized cross-correlations only. The loss is the same as that which occurs when data are trace equalized using a single gate containing the whole trace. It is not equivalent to an AGC operation. In case (ii), the correlated output is undistorted and, since the scaling constant is only a function of the particular non-linearity and the particular sweep statistics, if these are held constant from profile-to-profile, then true scaling both for the traces within a profile and for the traces from different profiles, is assured.

OPERATIONAL STEPS OF THE INVENTION

With the above as a guide, briefly, the operational steps of method of the present invention may now be specified using vibratory sweeps and conventional full-wave recordings, so as to produce final cross-correlation traces that are surprisingly distortion-free and so are superior to conventional cross-correlation traces. In accordance with method aspects, a preferred embodiment of the present invention includes the steps of:

A. Injecting vibrations into the earth by driving at least one vibratory source using a filtered control code of Gaussian, zero-mean, stationary seismic characteristics;

B. Recording the full-wave representations of the precursor (unfiltered) code and received full-wave vibrations that have propagated through the earth from the vibratory source(s) to the receiver(s) within an adjacent wellbore; and C. Cross-correlating the results of Step B. The result of such cross-correlation, without more, is the seismic record of interest that is surprisingly useful in oil and gas exploration.

The above three steps, performed in combination, give the result never achieved before: the final cross-correlation traces that are superior to cross-correlation traces that could have been made heretofore using a chirp source signal.

Briefly, superiority of the method of the present invention results from the fact that the use of the injected vibrations generated by a filtered Gaussian, zero-mean, stationary code, invert the signal collection and processing requirements for producing distortion-free final correlated records. Result: the final cross-correlation functions as depicted on the final records, surprisingly simulate operations of an impulsive causal system wherein the correlation functions begin at time zero equal to initiation of the vibrator. Thus, where the prior art performs any form of non-linear operation on the source or receiver signals, distortion would occur. But note that in my method, all such non-linear operations are performed in an inverse domain (the "noise" domain) and hence do not distort the essential nature of the final seismic records. Hence, the present invention can operate with superiority.

Within the above-identified area of usage, the step in the present invention, related to the injection of the aforementioned signals into the earth plays a very important role.

Hence, it is appropriate therefore to go into some detail concerning the nature of such vibrations and especially the control codes and the nature of the filtering used in conjunction with sweep generator 15 to drive the vibratory source 11 of the system shown in FIG. 1.

In the art of driving vibratory sources, extensive use has already been made of activating codes embodied on magnetic tape, so it is unnecessary to discuss in detail how the activating codes are used to drive the vibratory source 11. It should be commented, however, that sufficiently detailed equipment is now presently available for this purpose. For example, in Payton, Waters and Goupilland's U.S. Pat. No. 4,168,485 for "Simultaneous Use of Pseudo-random Control Signals in Vibrational Exploration Methods", a digital sweep generator is described that uses a digital control code to produce the desired control signal. Essentially, the digital control signal is placed in the memory of a digital computer as digital words which can be shifted out, in seriation, to a digital-to-analog converter. The converter, in turn, generates an alternating signal to drive the vibratory source, such a vibratory source 11. The output signal from the D/A converter is initially in the form of a series of stepped electrical functions in which amplitude changes, in steps, as a function on incremental time change. But after smoothing via a filter, the stepped signal becomes a more conventionally looking alternating control signal those amplitude varies smoothly with time, to provide the desired output signal.

It should also be noted that the art has further progressed where it is no longer necessary to use main-frame type computers on-board the field equipment truck. Advances in both areas of software and hardware technology now allow the explorationist a choice of numerous mini- and micro-computers for this purpose. Additionally, he is no longer required to generate the activating codes at a remote computer center and transport them on tape to the field location. Codes can now be generated in real time at the field site using the above-identified equipment and it seems possible that in the future this will become the preferred way to generate them.

The discussion here will concern itself with some of the possible options in preparing a code particularly suited for the practice of this invention; a code that results in the injection of the aforementioned vibrations into the earth. Thus, duration can be longer than that of conventional "chirp" signals. For discussion purposes, 32 seconds is a possible time interval. The magnetic tape devices used in geophysical prospecting in urban areas have various sampling intervals. Two milliseconds is a possible choice. Thirty-two seconds of code at a two-millisecond sampling rate require 16000 random numbers. These may be generated in several ways. One way is to use, in succession, two of the well-known subroutines in the IBM Scientific Subroutine Package: RANDU, to generate a set of uniformly-random numbers, then GAUSS, to convert those numbers into a set with Gaussian distribution. Other ways of generating suitable sets of numbers have been discussed by Lewis in the IBM Systems Journal No. 2 (1969) and by Knuth in his book "Seminumerical Algorithms" (Vol. 2 of the "Art of Computer Programming", Addison Wesley Pub. Co.). However it is done, the desired objective for purposes of this invention is a set of random numbers with a zero-mean, Gaussian, stationary drive code resulting therefrom.

A sequence of random numbers, 500 per second, may contain, in frequency terms, components up to 250 Hertz, and such frequencies are higher than those usually considered useful in current field vibrator work. In order to restrict the drive code to output frequencies considered useful in vibrator work but in a manner that provides final records that simulate operations of an impulsive causal system, the present invention puts the above-mentioned set of random numbers through a minimum phase digital band-pass filter. Result: frequency content is restricted to a selected band, say, between 10 and 80 Hz.

The last condition that the code should satisfy in order that the entire method of the present invention will correspond as nearly as practicable to the ideal conditions indicated by Bussgang's results, is the condition of "stationarity". Statistical stationarity, by definition, is the maintenance of the same statistical characteristics throughout the time interval of interest. Stationarity of both the source and receiver data is approached as closely as practicable by (1) beginning the actuation of the vibrator(s) long enough before the starting of the recording for transients associated with the impulse response of the earth to die down substantially (e.g., 6 seconds), and (2) continuing the non-impulsive actuation of the vibrators, such as 11, throughout the long-time interval conventional for the vibrations to propagate through the earth to the receiver, such as detector 13 within wellbore 12.

It was stated above, without the benefit of any supporting discussion, that the vibratory source(s) should be "substantially linearly-responding" (if controlled by a Gaussian, zero-mean, stationary driving code, for example), or the entire vibratory system can interact within itself, to provide the desired vibratory output. These conditions for properly carrying out the present invention may require changes from some of the present field practice of vibratory sources. Most conventional vibrators are equipped with automatic feedback mechanisms (e.g., phase-lock-loops) which are usually known as phase compensators. These devices are designed under the assumption that the signal driving the vibrator had a frequency content which is slowly varying in time. Experience has shown that phase compensators inherently lead to injection of a significantly distorted vibrator output and moreover were designed for use in association with conventional "chirp" signal injection, only. Hence, removal of the phase compensators is required to make non-impulsive vibrators operate when driver with filtered random sweeps of the present invention.

EXAMPLE

A field test is illustrative of the method of the present invention. In the test, the receiver nearest the shot is offset from the source. Spacing between receiver is 30 feet. Each group consisted of 6 receivers spaced 5 feet apart along the direction of survey.

In one instance, comparative data is generated using a conventional "chirp" signal of about 16 seconds duration of the form:

$$F(t) = A(t) \sin 2\pi \left[ at + \frac{bt^2}{2} \right]$$

$$(0 < t < T)$$

where the signal consists of a sinusoidal function of gradually and uniformly increasing frequency, starting at $w_o = 2\pi a(f_o = a)$ and ending at $w_f = 2\pi(a+bT)$. Thus, a sweep going from 10 to 100 Hz in 16 seconds has values of $a = 10$ and $b = 5.6$. The purpose of the function $A(t)$ is to have a multiplying factor in the sinusoidal function so that the sweep does not start or stop abruptly in amplitude.

The spectrum of the system input is assumed to be completely white so the shape of the amplitude spectrum of the received signal is the shape of the earth signal.

In the other instance, the spectrum of system output is Gaussian, zero-mean, and stationary. Duration: 16 seconds long. Sample rate: 2 milliseconds. The sweep is generated by passing a random number sequence generated with RANDU and GAUSS through a zero-phase filter. The amplitude response of the filter increases linearly from 0 Hz to 125 Hz at a rate of 12 db/octave. Above 125 Hz, the filter amplitude response decreases linearly at a rate of 72 db/octave.

Both sets of data are correlatable. I.e., to say a full amplitude representation of the conventional "chirp" signal is cross-correlatable with the full-wave signal received at each receiver group. Similarly, the full-wave representation of the unfiltered Gaussian, zero-mean, stationary sweep signal is cross-correlatable with the full-wave receiver signal of each receiver.

Comparing of the sets of data, it is evident from the data developed that the method of the present invention is far superior to processes using the conventional "chirp" method. Better resolution of adjacent waveform changes (in the traces provided by the method of the present invention) is the main advantage. Hence there is strong evidence that the present method provides final records that are superior to final processed records obtained using a conventional "chirp" signal.

From this point on, the discussion will be concerned with refinements and variations not necessary to make the basic method operable, but may be desirable for optimum performance.

Sometimes in vibrator seismology, in order to increase the effective signal-to-noise ratio, it is desirable to make repetitive sweeps and add the records from the successive repetitions expecting that desired signals will be reinforced and the noise will tend to cancel itself out. Result: since the correlation noise of any one sweep is different from that of any other sweep, the level of noise decreases as more sweeps are summed.

Some alternatives in the method of the present invention are illustrated in FIG. 2. Data paths are shown along which signal information flow during practice of the method. The original Gaussian code from the sweep generator 15 flows through minimum phase filter 16 on its way to the vibrator 11. The same code may or may not flow through anti-causal filter 39, depending on switch 38. Subsequently, the signal passes to the correlator and recorder unit 18. Representations of the full-wave received signals are seen to pass into the recorder unit 18. Within unit 18, the multi-bit correlation functions go directly to form the final record.

The invention is not limited to the specific embodiments described above, because variations will be readily apparent to those skilled in the art. Thus, the invention is to be given the broadest possible interpretation within the terms of the following claims.

What is claimed is:

1. A method of seismic surveying using non-impulsive vibratory sources that recovers all the essential information of full-waveform recording in a distortion-free manner whereby operations in accordance with an impulsive, causal exploration system are simulated, which comprises:

A. injecting non-impulsive, seismic vibrations into the earth by activating at least one vibratory source with a driving code of minimum phase, Gaussian, zero-mean, stationary characteristics;

B. recording the seismic vibrations that have propagated through the earth from said at least one vibratory source to at least one receiver within said wellbore; and C. cross-correlating a full-waveform preserved representation of a precursor Gaussian, zero-mean, stationary code, unfiltered, with said received seismic vibrations; the result of said cross-correlation being a seismic survey record that is essentially distortion-free and single-sided with time simulating results obtainable in accordance with said impulsive causal exploration system.

2. The method of claim 1, in which the time duration of said seismic vibrations is continuous throughout the time interval in which said propagated seismic vibrations are received, and essentially is equal to that for a conventional "chirp" signal.

3. The method of claim 1, in which when Steps A to C are repeated, a different time sequence of minimum phase, Gaussian, zero-mean, stationary drive codes is used for each time said steps are repeated.

4. The method of claim 1, in which said minimum phase Gaussian, zero-mean, stationary driving codes is filtered by means of a minimum-phase band-pass filter.

5. The method of claim 1, in which said precursor Gaussian, zero-mean, stationary code that is filtered before being used to drive said vibratory source by means of a minimum-phase, band-pass filter is itself also filtered before said code is recorded, through a anti-causal filter of conventional characteristics.

6. A method of seismic surveying using non-impulsive vibratory sources whereby operations in accordance with an impulsive, causal exploration system, is simulated, which comprises:

A. generating a Gaussian, zero-mean, and stationary precursor code;

B. filtering said precursor code through a minimum-phase band-pass filter;

C. driving at least one substantially linearly-responding seismic vibratory source with the resultant filtered code to inject non-impulsive signals into the earth for a time interval longer than the recording interval of the resultant seismic waves;

D. recording the full-wave seismic signals detected by at least one receiver positioned in said wellbore to detect said resultant seismic waves;

E. recording a waveform-preserved representation of said precursor Gaussian, zero-mean, stationary code without filtering thereof; and F. cross-correlating said waveform-preserved representation of said precursor code with the full-wave detected seismic signals; the result of said cross-correlating being a seismic record that is essentially distortion-free and single-sided with time) simulating results obtainable in accordance with said impulsive causal exploration system.

7. The method of claim 6, in which Steps A to F are repeated, and a different time sequence of precursor Gaussian, zero-mean, stationary seismic codes is used for each time said steps are repeated.

8. A method of seismic surveying using at least one non-impulsive vibratory source that recovers all essential information of full-waveform recording, in which operations in accordance with an impulsive, causal exploration system are simulated, which comprises:

A. injecting non-impulsive, seismic vibrations into the earth by activating at least one vibratory source with a driving code of minimum-phase, Gaussian, zero-mean, stationary characteristics;

B. recording a full-wave unfiltered representation of said code;

C. recording a waveform-preserved representation of the seismic vibrations that have propagated through the earth from said at least one vibratory source to at least one receiver in said wellbore in an up-going direction; and D. cross-correlating said full-wave representation of said unfiltered Gaussian, zero-mean, stationary code with said waveform-preserved representation of the recording of said propagated seismic vibrations by said receiver; the result of said cross-correlation being a seismic survey record essentially distortion-free and single sided with time, simulating results obtainable by said impulsive causal exploration system.

* * * * *